May 23, 1967
L. S. TAYLOR ETAL
3,320,922
INDICATOR HEAD FOR LIQUID LEVEL GAUGE
AND PROCESS OF MAKING SAME
Filed March 15, 1965
2 Sheets-Sheet 1
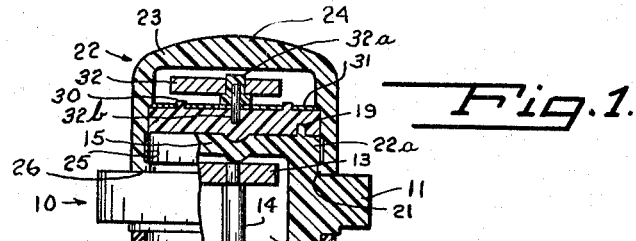
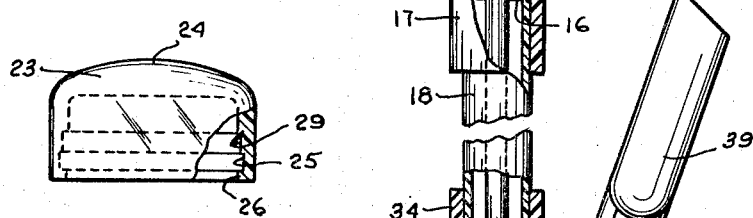
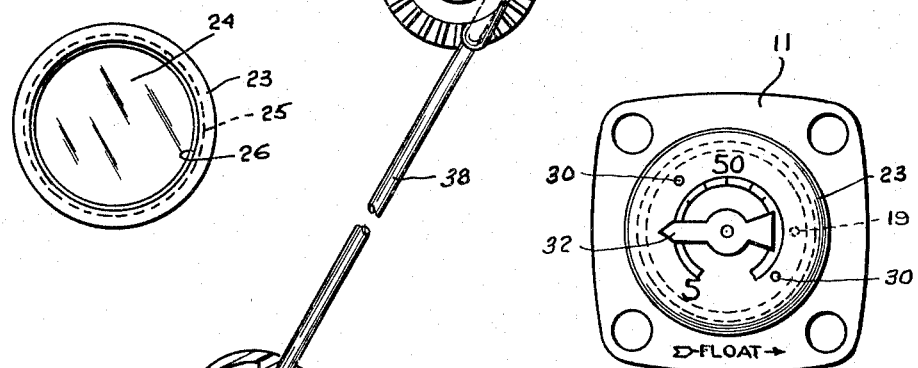
INVENTORS.
LETA S. TAYLOR
PAUL B. JOHNSON
EUGENE D. HUSKEY
BY
ATTORNEY.

May 23, 1967    L. S. TAYLOR ETAL    3,320,922
INDICATOR HEAD FOR LIQUID LEVEL GAUGE
AND PROCESS OF MAKING SAME

Filed March 15, 1965      2 Sheets-Sheet 2

INVENTORS.
LETA S. TAYLOR
PAUL B. JOHNSON
EUGENE D. HUSKEY
BY
ATTORNEY.

3,320,922
INDICATOR HEAD FOR LIQUID LEVEL GAUGE AND PROCESS OF MAKING SAME
Leta S. Taylor, Paul B. Johnson, and Eugene D. Huskey, Garland, Tex., assignors to J. Y. Taylor Mfg. Company, a corporation of Texas
Filed Mar. 15, 1965, Ser. No. 439,843
5 Claims. (Cl. 116—118)

This invention relates to liquid level gages and has particular reference to a new and improved indicator head for magnetic type liquid level gages for fluids or liquified gases and especially those stored under pressure such as butane and propane.

An object of the invention is to provide a new and improved indicator head for liquid level gages which head may be formed entirely independently of the gage and secured thereto as a unit thereby allowing the gage to be adapted to use with various fluids or liquid gases by use of an indicator head intended for such particular use.

Another object of the invention is to provide a new and improved indicator head for liquid level gages and which is relatively simple and economical to manufacture and assemble in operative relation with the gage, and the process of making same.

Another object is to provide a new and improved indicator head for liquid level gages which is capable of use on gage heads of any desired suitable material.

Another object of the invention is to provide a new and improved indicator head for liquid level gages which provides improved viewing of the indicator and dial.

Another object of the invention is to provide a new and improved indicator head for liquid level gages, the elements of which are capable of being manufactured by relatively simple and inexpensive casting process of relatively inexpensive plastic material.

Another object of the invention is to provide a new and improved indicator head for liquid level gages which has a crystal with a magnifying portion for magnifying the image of the dial and indicator to facilitate the reading of the gage.

Other objects and advantages of the invention will be apparent from the foregoing description taken in connection with the accompanying drawings wherein the preferred form of the invention has been given by way of illustration.

Referring to the drawings:

FIG. 1 is a side view, partially in section, of a liquid level gage constructed according to the invention;

FIG. 2 is a top or plan view of the gage head and indicator head of the present invention;

FIG. 3 is a side view, partially in section, of the crystal embodied in the indicator head;

FIG. 4 is a top or plan view of the crystal of FIG. 3; and

Figure 5:
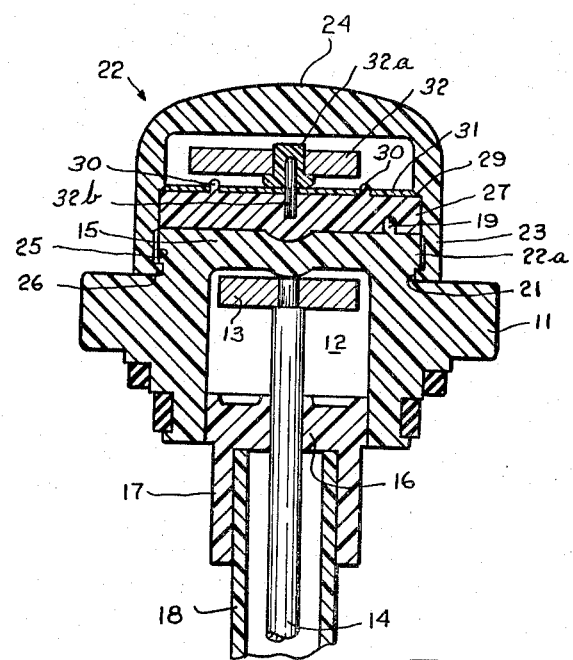
FIG. 5 is a sectional view of the gage head and indicator head shown in FIG. 1 but on an enlarged scale.

Referring more particularly to the drawings wherein similar reference characters designate corresponding parts throughout the several views, the device shown formed according to the invention comprises a gage head designated generally at 10, having the rim 11 through which are provided openings for bolts or other suitable fastening means for securing the gage head 10 in operative position over an opening in the storage tank. Gage head 10 may be cast or molded of suitable plastic material as hereinafter set forth or die cast of aluminum or zinc depending upon the use intended.

Gage head 10 is provided with chamber 12 for drive magnet 13 which is rigidly secured on the upper end of rotatably mounted shaft 14, whereby pivotal movement or rotation of shaft 14 effects simultaneous rotation or pivotal movement of drive magnet 13.

The upper end of gage head 10 is closed or sealed by wall 15 which is formed integral with gage head 10.

The lower side of chamber 12 is closed by the wall of connector 16 which is formed with integral tubular connector portion 17 depending therefrom to which is secured the upper end of tubular riser 18 which is in telescoping relation with connector portion 17 and secured thereto by bonding or staking.

Connector 16 with tubular portion 17 is molded or cast of chemical resistant plastic.

The locating lug 19 is provided on the upper surface of wall 15 which is also provided with a central recess 20 and peripheral groove 21 which is formed beneath peripheral flange 22a.

The indicator head designated generally at 22 comprises gage head crystal 23 which is molded or cast of clear, colorless, transparent plastic such as Plexiglas or other material such as those listed hereinafter or may be formed of glass, and may include a portion over dial 31 having curved surface contours 24 of such curvature as to provide desired magnifiication in such portion 24 to facilitate the reading or viewing of the indications on the dial.

Also, the central or viewing portion of the crystal over dial 31 may be clear or transparent and the side portions of desired color.

Gage head crystal 23 is provided with the peripheral groove 25 adapted to fit over peripheral flange 22a and may be secured thereto by suitable adhesive with rim or lug 26 positioned in peripheral groove 21 whereby the entrance of moisture or dust or the like into indicator head 22 is prevented.

Within indicator head 22 is provided dial plate 27 which has recesses in its lower surface for receiving locating lugs 19 to properly orient indicator head 22 on gage head 10 and said dial plate 27 also may have a central offset portion 28 adapted to be positioned in recess 20 in the upper surface of wall 15.

Dial plate 27 is preferably made by molding or casting of suitable plastic or other material and secured in desired position in indicator head 22 against flange 29 by suitable bonding material or adhesive.

To locate the indicator head in desired or predetermined position on the gage head there are provided on the upper surface of dial plate 27, the locating lugs 30 adapted to be positioned in corresponding openings in dial face 31 which may be formed of suitable metal such as aluminum or of other desired material such as molded or cast plastic and this dial face is provided with suitable indicia thereon whereby magnetic pointer 32 indicates on such dial face 31 the contents of the storage tank. Pointer 32 is carried by pointer hub 32a which in turn is mounted for pivotal movement on pivot 32b which is carried by dial plate 27.

The gage head 10 is formed by casting or molding of suitable plastic material or die cast of aluminum, zinc or other material depending upon the use to be made of the gage.

Indicator head 22, including crystal 23, dial plate 27, dial face 31, pointer 32, pointer pin 32b and hub 32a are assembled to form a single self-contained and sealed indicator head which is pressed on to the gage head and secured thereto by engagement of the rim or lug on the indicator head into the retaining groove in the gage head.

The cast or molded plastic fork 33 has the tubular portion 34 adapted to receive the end of riser 18 and be secured thereto by staking or bonding by suitable chemical dependent upon the plastic material of which the fork 33 and riser 18 are constructed.

Shaft 14 has its end portion extending through an opening in the wall of fork 33 and on the end of said shaft 14 is positioned driven gear 35 which is formed of cast or molded plastic and either pinned to the drive shaft 14 or formed thereon in the case of a metal drive shaft or formed integral therewith in the case of a plastic drive shaft. The driven gear 35 is preferably formed of wear resistant material such as nylon.

The drive gear 36 is pivotally mounted on pivot 37 in fork 33. This drive gear 36 is preferably formed of wear resistant material such as nylon and meshes with driven gear 35 to thereby pivot drive shaft 14. Float rod 38 and counterweight 39 may be a metal rod cast or molded to gear 36 which rod can be plastic coated to render them more resistant to chemical reaction, or they can be of plastic and cast or molded integral with drive gear 36.

Float 40 is of chemical resistant plastic and can be secured to float rod 38 where such rod is of metal and can be cast or molded thereon or molded integral therewith when said rod 38 is made of plastic.

Counterweight 39 can be made of desired weight by controlling the size or material of which it is constructed or it can be formed of plastic coated metal. It is preferable that the unitary drive gear, counterweight, float arm and float be molded or cast as stated above to simplify and reduce the cost of manufacture thereof.

In the manufacture of the liquid level gage of this invention, the gage head 10 may be formed of die cast metal such as aluminum or zinc or molded or cast of a plastic having sufficient strength such as nylon or an acrylonitrile-butadiene-styrene composition which is relatively stable, tough, hard and rigid and withstands acids and pressure and resists weather.

Other plastics which might be employed depending upon the material with which the gage is to be used are polycarbonates, polystyrenes, acrylics, vinyls or others with suitable properties.

Other parts, such as the indicator head, connector riser, fork, drive rod, and drive gears may also be formed of such plastic materials.

Drive magnet and the end of shaft 14 are then placed in chamber 12 in gage head 10 with shaft 14 extending through the opening in the wall of connector 16 to which connector 16 the end of riser 18 is secured as stated above.

Connector 16 is connected to gage head 10 by bonding or by suitable adhesive.

Fork 33 is then secured on the end of riser 18 by staking or by bonding or by suitable adhesive to connect tubular portion 34 of fork 33 to the end of riser 18, with shaft 14 extending therethrough.

The unit consisting of drive gear 36, float rod 38, float 40 and counterweight 39 is then mounted on fork 33 by pivot pin 37 with gears 35 and 36 in meshing relation.

Where gear 35 is formed integral with shaft 14 it will be necessary to mount fork 33, riser 18 and connector 16 together as a unit before mounting drive magnet 13 on shaft 14 and then connecting this assembly to gage head 10 as previously described.

The indicator head, which is formed as a unit, as described above is mounted on the upper side of gage head 10 to complete the assembly.

As shown in the drawings, a suitable gasket is provided between the gage head 10 and the storage tank to seal this connection.

From the foregoing it will be seen that we have provided new and improved means and process for obtaining all of the objects and advantages of the invention.

We claim:
1. An indicator head for a liquid level gauge comprising a unitary, substantially cup shaped crystal cast of non-metallic material, said crystal having a substantially transparent viewing portion and an internal flange, a dial plate in said crystal adjacent said internal flange, a dial carried by said dial plate and an indicator pivotally mounted on said dial plate relative to said dial, said crystal having a peripheral portion secured to a rim portion on the gauge head.

2. An indicator head for a liquid level gauge according to claim 1 wherein the peripheral portion of the crystal has a rim positioned in a peripheral groove of the gauge head to secure the indicator head in operative position on the gauge head.

3. An indicator head for a liquid level gauge according to claim 1 wherein the transparent viewing portion of the crystal has its surface contours formed to provide magnification of the dial and indicator viewed therethrough.

4. An indicator head for a liquid level gauge according to claim 1 wherein locating means are provided in the adjacent surfaces of the dial plate and gauge head on which the dial plate is supported, for locating the dial in predetermined relation on the gauge head.

5. An indicator head for a liquid level gauge according to claim 1 wherein the crystal has a peripheral portion overlying and secured to a portion of the periphery of the gauge head and a rim positioned in a peripheral groove in the gauge head.

References Cited by the Examiner

UNITED STATES PATENTS

| | | | |
|---|---|---|---|
| 1,442,758 | 1/1923 | Wilcox | 58—55 |
| 1,911,099 | 5/1933 | White et al. | 73—290 |
| 2,012,002 | 8/1935 | Finch | 58—55 |
| 2,300,614 | 11/1942 | Connolly et al. | 73—290.1 |
| 2,311,387 | 2/1943 | Hastings | 73—317 |
| 2,350,164 | 5/1944 | Heymann | 58—55 |
| 2,512,757 | 6/1950 | Westall | 73—306 |
| 2,514,323 | 7/1950 | Ford | 310—104 |
| 2,528,640 | 11/1950 | Coleman | 324—115 |
| 2,562,604 | 7/1951 | Couchey | 73—306 |
| 2,584,446 | 2/1952 | Hastings et al. | 73—317 |
| 2,612,132 | 9/1952 | Triplett | 116—129 |
| 2,630,715 | 3/1953 | Hall et al. | 73—317 |
| 2,631,182 | 3/1953 | Hall et al. | 73—306 |
| 2,794,412 | 6/1957 | Rauth | 116—129 |
| 2,795,955 | 6/1957 | Hall | 73—317 |
| 2,828,625 | 4/1958 | Morphis et al. | 73—431 |
| 2,836,144 | 5/1958 | Morphis | 116—129 |
| 2,852,742 | 9/1958 | Bakke et al. | 324—115 |
| 2,866,940 | 12/1958 | Lamb | 73—431 |
| 2,992,560 | 7/1961 | Morgan et al. | 73—317 |
| 3,043,038 | 7/1962 | Marble | 58—55 |
| 3,138,137 | 6/1964 | Hubner | 116—129 |
| 3,162,173 | 12/1964 | Morgan et al. | 116—129 |

FOREIGN PATENTS 1,135,117 12/1956 France.

LOUIS J. CAPOZI, *Primary Examiner.*